US012662140B2

(12) United States Patent
Li et al.

(10) Patent No.: US 12,662,140 B2
(45) Date of Patent: Jun. 23, 2026

(54) MACHINE LEARNING-BASED ANOMALY DETECTION AND ALERT SYSTEM FOR OIL PUMPS

(71) Applicant: Atieva, Inc., Newark, CA (US)

(72) Inventors: Jingman Li, Newark, CA (US); Mengqi Yao, Newark, CA (US); Sahil Rahimi, Newark, CA (US); Ray Zheng, Newark, CA (US); Joanne Lin, Newark, CA (US)

(73) Assignee: Atieva, Inc., Newark, CA (US)

( * ) Notice: Subject to any disclaimer, the term of this patent is extended or adjusted under 35 U.S.C. 154(b) by 6 days.

(21) Appl. No.: 18/933,782

(22) Filed: Oct. 31, 2024

(65) Prior Publication Data

US 2026/0116402 A1     Apr. 30, 2026

(51) Int. Cl.
*B60W 50/02*      (2012.01)
*G06N 20/20*      (2019.01)

(52) U.S. Cl.
CPC ......... *B60W 50/0205* (2013.01); *G06N 20/20* (2019.01); *B60W 2050/021* (2013.01)

(58) Field of Classification Search
CPC ....... B60W 50/0205; B60W 2050/021; B60W 50/02; G06N 20/20
See application file for complete search history.

(56) References Cited

U.S. PATENT DOCUMENTS

2008/0286613 A1*  11/2008  Furukawa ......... H01M 8/04753
                                                            429/410
2016/0131163 A1*   5/2016  Tolbert .................... F16H 61/44
                                                             60/489

2018/0252566 A1*   9/2018  Fjalestad ................... G01F 1/34
2019/0339688 A1*  11/2019  Cella ........................ H04L 67/12
2020/0362800 A1*  11/2020  Keblusek .............. F02D 41/005
2021/0222689 A1*   7/2021  Kirch ........................ F04B 17/03
2021/0227627 A1*   7/2021  Kirch ........................ F04B 23/00
2023/0291657 A1*   9/2023  Cawley ................ H04L 41/147

(Continued)

FOREIGN PATENT DOCUMENTS

CN          115559886 A       1/2023

OTHER PUBLICATIONS

Guo, Energy-efficient battery thermal management strategy for range extended electric vehicles based on model predictive control and dynamic programming (Year: 2024).*

(Continued)

*Primary Examiner* — Adam R Mott
*Assistant Examiner* — Sagar Kc
(74) *Attorney, Agent, or Firm* — Womble Bond Dickinson (US) LLP

(57)                 ABSTRACT

A system for detecting an anomaly of a vehicle pump. The system receives input parameters comprising at least a pump speed command to a pump of a vehicle at a time t, and an electric current of the pump prior to the time t. The system applies, to the input parameters, a machine learning model, configured to determine one or more output parameters comprising at least a predicted electric current of the pump at the time t, in response to the pump speed command. The system determines, based at least on the predicted electric current of the pump and a sensed electric current of the pump at the time t, whether an anomaly is associated with the pump of the vehicle.

21 Claims, 9 Drawing Sheets

(56)                    References Cited

U.S. PATENT DOCUMENTS

| | | | |
|---|---|---|---|
| 2024/0017589 A1* | 1/2024 | Lian | B60L 3/0061 |
| 2024/0052826 A1* | 2/2024 | He | F04B 49/06 |
| 2024/0329619 A1* | 10/2024 | Shifflette | G05B 19/4065 |
| 2025/0086045 A1* | 3/2025 | Barnes | G06F 11/079 |
| 2025/0199524 A1* | 6/2025 | Murthy | G05B 23/0283 |

OTHER PUBLICATIONS

Search Report received in related European patent application No. 25211414.5, mailed May 6, 2026, 9 pages.

Hallaji Seyed Mostafa et al.: "Predictive maintenance of pumps in civil infrastructure: State-of-the-art, challenges and future directions", Automation in Construction Elsevier, Amsterdam, NL, vol. 134, Nov. 22, 2021 (Nov. 22, 2021), XP086915365, ISSN: 0926-5805, DOI: 10.1016/J.AUTCON.2021.104049 [retrieved on Nov. 22, 2021].

* cited by examiner

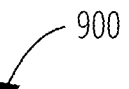

RECEIVE INPUT PARAMETERS COMPRISING AT LEAST A PUMP SPEED COMMAND TO A PUMP OF A VEHICLE AT A TIME T, AND AN ELECTRIC CURRENT OF THE PUMP PRIOR TO THE TIME T 902

APPLY, TO THE INPUT PARAMETERS, A MACHINE LEARNING MODEL, CONFIGURED TO DETERMINE ONE OR MORE OUTPUT PARAMETERS COMPRISING AT LEAST A PREDICTED ELECTRIC CURRENT OF THE PUMP AT TIME T, IN RESPONSE TO THE PUMP SPEED COMMAND 904

DETERMINE, BASED AT LEAST ON THE PREDICTED ELECTRIC CURRENT OF THE PUMP AND A SENSED ELECTRIC CURRENT OF THE PUMP AT THE TIME T, WHETHER AN ANOMALY IS ASSOCIATED WITH THE PUMP OF THE VEHICLE 906

FIG. 9

MACHINE LEARNING-BASED ANOMALY DETECTION AND ALERT SYSTEM FOR OIL PUMPS

FIELD

Embodiments disclosed relate generally to automobile technology, and more particularly, to a machine learning-based anomaly detection and alert system for oil pumps.

BACKGROUND

A fluid pump is a mechanical device that moves fluids (e.g., a liquid or a gas) from one location to another. Fluid pumps may comprise different mechanisms (e.g., gear pumps, vane pumps, etc.) to create a change in a fluid to cause fluid movement. Fluid pumps are used in different applications such as water delivery systems, heating and air conditioning systems, vehicle fuel delivery, power plants, etc.

Vehicles may employ one or more pumps that move fluid through one or more fluid lines. Vehicle pumps may be used to pump oil through a motor, or to pump coolant (e.g., water, glycol, etc.,) through one or more fluid lines, or both. If a pump fails, or fluid is loss through a leak, or the fluid becomes blocked, this may prevent the proper lubrication of a motor, or the intended transfer of thermal energy, thereby resulting in potential overheating of the vehicle, reduced efficiency or performance of the vehicle, damage to one or more components of the vehicle, or a combination thereof. It is beneficial to detect anomalies associated with vehicle pumps, so that the vehicle operates as intended, and risk of harm to the vehicle can be reduced.

SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In an aspect of the present disclosure, a system comprising one or more computing devices is configured to use a machine learning model to predict operation of a vehicle pump using real vehicle data. The predicted operation is compared to the real vehicle data to determine whether an anomaly is associated with the vehicle pump. For example, a system may receive input parameters comprising at least a pump speed command to a pump of a vehicle at a time t, and an electric current of the pump prior to the time t (e.g., t−1). They system applies, to the input parameters, a machine learning model, configured to determine one or more output parameters comprising at least a predicted electric current of the pump at time t. The system determines, based at least on the predicted electric current of the pump and a sensed electric current of the pump at the time t, whether an anomaly is associated with the pump of the vehicle.

In an embodiment, the input parameters further comprises a fluid temperature (e.g., an oil temperature or coolant temperature) associated with the pump, sensed prior to the time t (e.g., t−1).

In an embodiment, the input parameters indicate a battery heating state (e.g., dynamic or static heating). This may be used to group the sensed and predicted pump behavior.

In an embodiment, determining whether the anomaly is associated with the pump of the vehicle comprises determining a difference between i) a time-series of the sensed electric current and ii) a time-series of the predicted electric current; and determining that the anomaly is associated with the pump in response to when the difference satisfies a threshold. In an embodiment, determining whether the anomaly is associated with the pump of the vehicle further comprises grouping the time-series of the sensed electric current and the time-series of the predicted electric current into first sessions and second sessions, based on the first state and the second state, and determining that the anomaly is associated with the pump in response to when a combined difference of the first session satisfies a first threshold. In an embodiment, determining whether the anomaly is associated with the pump of the vehicle further comprises determining that the anomaly is associated with the pump in response to when a threshold number of second sessions is satisfied, and when a second combined difference of a subset of the second sessions satisfies a second threshold.

In an embodiment, the pump is configured to pump oil through an electric motor of the vehicle. Additionally, or alternatively, the pump (e.g., a second pump) is configured to pump coolant through the vehicle.

In an embodiment, determining the anomaly comprises determining at least one of: an oil leakage, an oil fill amount, pump blockage, or pump debris. In an embodiment, determining the anomaly comprises determining a severity of the anomaly, at least based on an amount of the difference.

Other technical features may be readily apparent to one skilled in the art from the following figures, descriptions, and claims.

BRIEF DESCRIPTION OF THE DRAWINGS

The present disclosure will be understood more fully from the detailed description given below and from the accompanying drawings of various embodiments, which, however, should not be taken to limit the embodiments described and illustrated herein, but are for explanation and understanding.

FIG. 9 shows a flow diagram of a method for performing machine learning based pump anomaly detection, in accordance with an embodiment.

DETAILED DESCRIPTION

Figure 1:
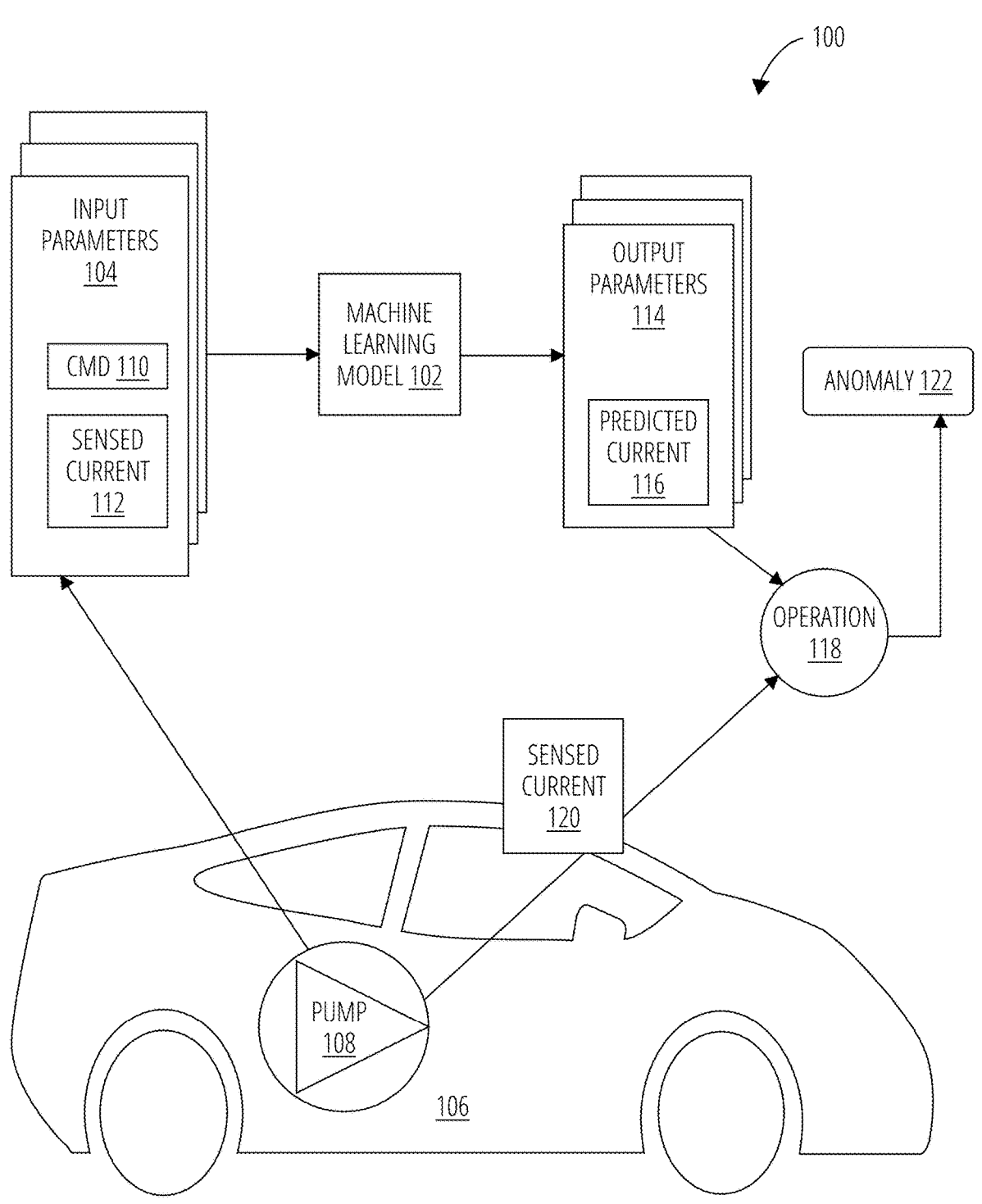
FIG. 1 shows an example system for pump anomaly detection of a vehicle, using machine learning, in accordance with an embodiment.

In the following description, numerous details are set forth. It will be apparent, however, to one of ordinary skill in the art having the benefit of this disclosure, that the embodiments described herein may be practiced without these specific details. In some instances, well-known structures and devices are shown in block diagram form, rather than in detail, in order to avoid obscuring the embodiments described herein.

Embodiments disclosed relate generally to automobile technology, and more particularly, to leveraging a machine learning model to perform anomaly detection for a fluid pump (e.g., an oil pump or coolant pump).

A vehicle may comprise a pump to circulate a fluid (e.g., oil or a coolant). An electric vehicle may comprise an electric motor, and oil may be circulated through one or more components of the electric motor to promote proper lubrication and thermal heat transfer in connection with operation of the motor. An anomaly may occur such as, for example, a fluid leak, low fluid amount, blockage, and/or debris in the fluid path. Such an anomaly may result in damage to vehicle components, cause smoke, and/or overheating of the vehicle drive unit (e.g., the motor or drive circuit that commutates the motor). Ultimately, components may burn or cease to operate due to the anomaly.

Existing anomaly detection systems may use a hard-coded event detection approach. Sensors may sense signals (e.g., oil level, oil temperature) during static or dynamic battery heating, and this may be performed for a limited duration (e.g., 30 seconds). An alert may be generated when a critical situation is detected (e.g., oil level is low during battery heating). Such systems may be prone to trigger false alerts because they fail to account for characteristics specific to a particular vehicle model, the state of the vehicle, and non-linear behavior of a pump given a current speed command and a previous electric current load. Further, such systems may not account for time-series data, generated on a per-session basis, grouping each session based on usage of the pump (e.g., whether the pump is being activated while battery heating). Such a system lacks the ability to categorize severity of the anomaly, or to trigger an alert at an early stage of potential pump failure.

Aspects of the present disclosure describe a method and system for effectively detecting anomalies within a drive unit oil pump or other vehicle pump, using advanced machine learning models. Given there is typically a lack of a physical sensor in an oil pump, traditional anomaly detection methods lack the ability to detect subtle deviations in the oil pump performance. With these subtle deviations detected, aspects described may improve service and maintenance of a vehicle that is out in the field. Aspects of the present disclosure leverage the power of machine learning models to enhance anomaly detection capabilities, which may be tailored to detect drive unit pump anomalies, while ensuring full automated detection and notification processes. Methods and systems described may analyze pump anomalies pattern in an intelligent way by interpreting customer fleet telemetry data through machine learning models. This enables earlier stage detection for abnormal behaviors compared to traditional monitoring system. Furthermore, the system may promptly alert engineers and the service team and facilitate a rapid response to potential issues through the integration of an internal engineering tool, e.g., a graphical user interface tool.

Aspects of the present disclosure use a machine learning model to predict behavior of a pump based on detected parameters of the pump, such as a pump speed command to the vehicle pump, and the previous electric current load of the pump. The machine learning model may be trained to predict the electric current load of the pump in response to the pump speed command. The predicted electric current load is compared to the actual electric current load of the pump under that pump speed command. An anomaly is detected based on this comparison. For example, if the predicted electric current load is lower than measured electric current load, then this may indicate that the oil level is low (e.g., below a threshold) or that a leak is present. If the measured electric current load is higher than predicted, this may indicate that debris or blockage is present. More generally, if the difference between the measured pump parameters and predicted output parameters satisfies a threshold, this may indicate an anomaly is present with the vehicle pump. This difference may be determined over a period of time (e.g., a session) or based on a plurality of sessions, which may reduce the risk of falsely detected anomalies.

In an embodiment, the machine learning model may receive, as input, an indication of whether the pump is being operated while the EV is performing battery heating. Utilizing EV drive units (e.g., an electric motor and inverter) to generate and transfer thermal energy to the EV battery pack optimizes the battery pack's charging performance (e.g., faster charge time, reduced internal resistance). This battery heating may be performed statically (e.g., while the vehicle is stationary) or dynamically (e.g., while the vehicle is in motion). Given that the different heating states may affect the predictions of electric current draws and fluid temperature, the machine learning model is learned to account for these scenarios when it predicts the pump current draw and/or the fluid temperature.

In an embodiment, the anomaly detection may be performed offline by obtaining the measured data (e.g., pump current, pump command, fluid temperature, battery heating state) from vehicle telemetry. For example, the vehicle may comprise an onboard computer coupled to one or more wired or wireless transceivers to transmit this data to one or more computer systems where the machine learning model is applied to generate the predicted pump parameters. Additional analysis may be performed such as generating session-based timelines of the predictions and comparing these to the corresponding measured data to determine whether an anomaly is present. The session-based timelines may be determined based on the battery heating indicator, as described further in other sections.

Some portions of the detailed description that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "receiving", "transmitting", "storing", "determining", "applying", "detecting", or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The embodiments discussed herein may also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMS, EEPROMs, magnetic or optical cards, or any type of media suitable for storing electronic instructions.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the embodiments discussed herein are not described with reference to any particular programming language. It will be appreciated that a variety of programming languages may be used to implement the teachings as described herein.

FIG. 1 shows an example system for pump anomaly detection of a vehicle, using machine learning, in accordance with an embodiment.

As system 100 may receive input parameters 104. These input parameters 104 may be associated with operation and measurement of a pump 108. The input parameters 104 may comprise at least a pump speed command 110 to a pump 108 of a vehicle 106 at a time t, and an electric current 112 of the pump prior to the time t (e.g., time t−1).

The system applies machine learning model 102 to the input parameters 104. The machine learning model 102 is configured to determine one or more output parameters 114 comprising at least a predicted electric current 116 of the pump at time t. This predicted electric current 116 is the predicted load response of the pump 108, in response to the pump speed command 110.

The system (e.g., at operation 118) determines, based at least on the predicted electric current 116 of the pump and a sensed electric current 110 of the pump at the time t, whether an anomaly is associated with the pump of the vehicle. The actual pump parameters (e.g., pump speed command 110, sensed electric current 112, sensed electric current 120) may be obtained through vehicle telemetry. For example, vehicle 106 may comprise one or more communication buses that carry these signals between vehicle computers and/or sensors. A vehicle computer may store these signals in computer memory, and transmit them to the system 100 upon request (e.g., over a wired or wireless computer network).

In an embodiment, the input parameters 104 further comprises a fluid temperature associated with the pump, sensed prior to the time t (e.g., time t−1), and the one or more output parameters further comprise a predicted oil temperature at the time t. This predicted oil temperature may be determined by machine learning model 102 based on training data correlating a typical change in oil temperature (under non-failure conditions) based on the previous sensed oil temperature, the pump speed command 110, and the predicted electric current 116.

In an embodiment, the input parameters 104 further comprises an indication (e.g., a signal) of a first vehicle state, that the vehicle is operating the pump to transfer thermal energy to the electric vehicle. In an embodiment, the input parameters 104 further comprises an indication (e.g., a signal) of a second vehicle state that the vehicle is not operating the pump to transfer thermal energy to the electric vehicle. In an embodiment, the indications can be the same signal with a different value to indicate the respective state.

In an embodiment, determining whether the anomaly is associated with the pump of the vehicle comprises determining a difference between i) a time-series of the sensed electric current and a time-series of the sensed fluid temperature; and ii) a time-series of the predicted electric current, and a time series of the predicted fluid temperature. The system may determine that the anomaly 122 is present, in response to when the difference satisfies a threshold. For example, a time-series graph may be generated of the predicted electric current 116 over a period of time spanning t1-t2, and another time-series graph may be generated by system 100 of the sensed electric current 120 over the same period of time. Each period may be referred to as a session, and the predicted electric current 116 and sensed electric current 120 in the same session are compared to determine the difference between in that session. If that difference (e.g., an average magnitude difference, a peak magnitude difference, etc.,) satisfies a threshold, the system 100 may deem that an anomaly 122 is associated with pump 108.

In an embodiment, the pump 108 is configured to pump oil through an electric motor of the vehicle. Additionally, or alternatively, the pump 108 may be configured to pump coolant through the vehicle. For example, the pump may be configured to pump coolant (e.g., water, glycol, or other liquid) to transfer thermal energy between the electric motor of the vehicle and a battery pack of the vehicle. In an embodiment, the anomaly 122 comprises at least one of: an oil leakage, an oil fill amount, pump blockage, or pump debris. For example, based on the predicted difference indicating that the predicted electric current 116 is lower than the sensed electric current 120, the system 100 may determine the anomaly 122 as an oil leak or low oil amount. Additionally, or alternatively, the system 100 may determine the anomaly 122 as a pump blockage or pump debris if the predicted electric current 116 is higher than the sensed electric current 120.

In an embodiment, the system 100 determines a severity of the anomaly 122 (e.g., low, medium, high, a severity score, etc.). The severity may be determined based on an amount of the difference, such as each severity being determined based on a respective threshold, and/or other factors such as a number of sessions in which the difference is detected, a number of consecutive sessions, and/or the state of the battery heating state, or a combination thereof.

Figure 2:
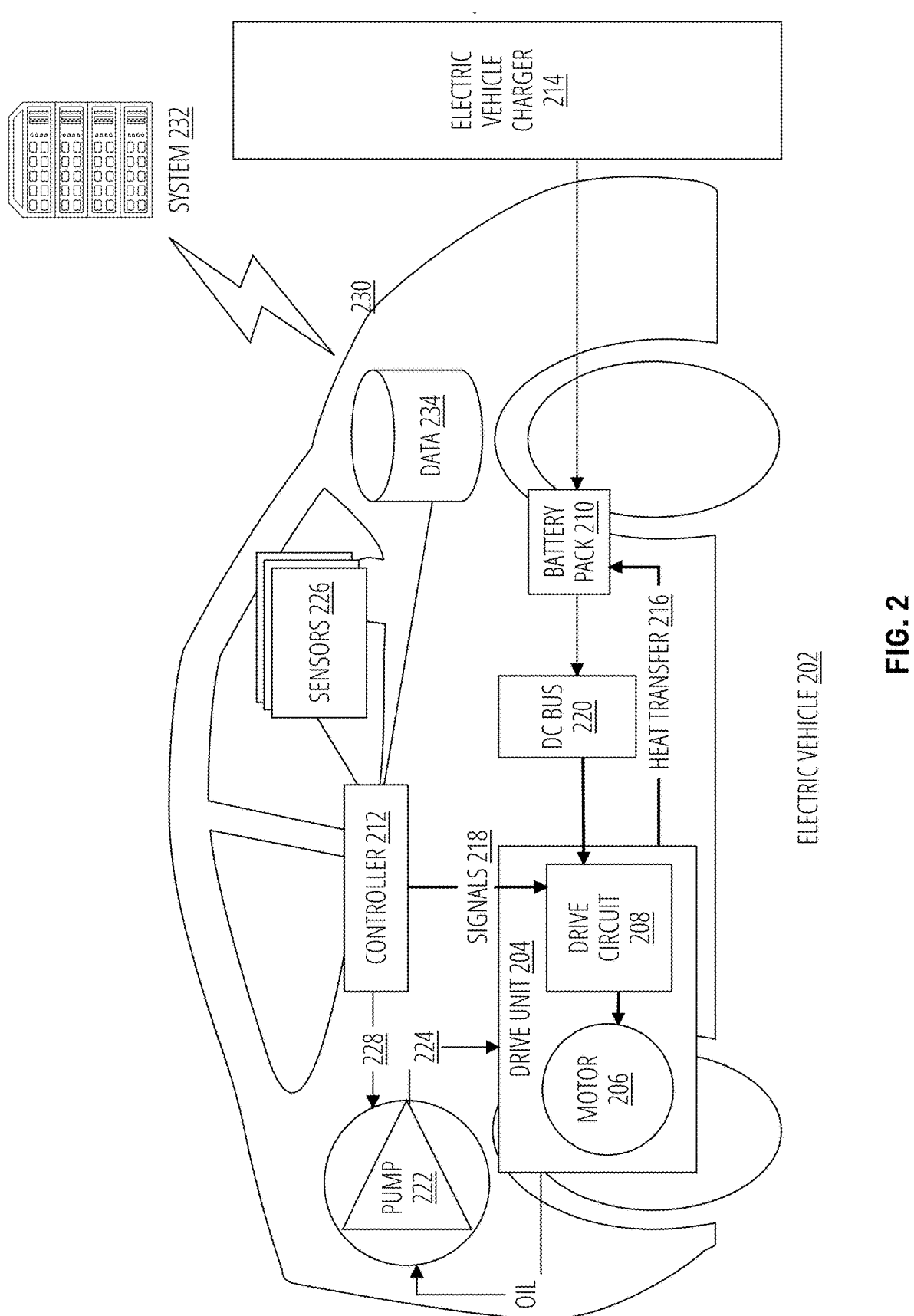
FIG. 2 shows an illustration of an electric vehicle (EV) that may sense and collect pump data for anomaly detection, in accordance with an embodiment.

FIG. 2 shows an illustration of an electric vehicle (EV) that may sense and collect pump data for anomaly detection, in accordance with an embodiment.

The EV 202 comprises an electric motor 206. Electric motor 206 may be an alternating current (AC) electric motor. Electric motor 206 may comprise an induction motor (e.g., a three-phase induction motor), or other motor type (e.g., a permanent magnet synchronous motor (PMSM), etc.). Electric motor 206 converts battery energy into torque that turns the wheels of EV 202. The motor may be powered by alternating current (AC) generated by drive circuit 208. Drive circuit 208 may convert DC voltage from DC bus 220 to AC and apply the AC current through the stator of electric motor 206, which creates a magnetic field that applies a force on a magnet (e.g., on a rotor of the motor 206), resulting in a torque and rotation of the rotor of motor 206.

Drive circuit 208 comprises a plurality of power semi-conductors coupled to the DC bus 220 of the EV 202, and coupled to the electric motor 206. The plurality of power semi-conductors are configured to drive the electric motor 206 in accordance with control signals 218. Drive circuit 208 may be referred to as an inverter. Depending on application, different power switching semi-conductors may be used, such as power transistors, IGBTs, MOSFETs, etc. These are connected to form a circuit that drives current through windings of the motor 206 when the semi-conductors are driven to close (conduct) or open in accordance with the control signals 218.

Drive circuit 208 and motor 206 may collectively be referred to as drive unit 204. In an embodiment, EV 202 may comprise two or more drive units (e.g., a front drive unit and a rear drive unit), each with a respective drive circuit 208 and motor 206.

EV 202 comprises a battery pack 210 that includes a plurality of battery cells (e.g., cylindrical, prismatic, etc.). These cells may be interconnected electrically in series and parallel to form a desired DC voltage, current capacity, and power output. The battery pack 210 may comprise a battery management system (BMS) and sensors that may sense voltage, current, and temperature at one or more points of the battery pack 210. The battery pack may comprise an optimal charging temperature range, which may depend on the battery chemistry, how the batteries are packaged, etc.

Battery pack 210 may be connected to a DC/DC converter (not shown) to generate a regulated and steady DC voltage (e.g., a voltage greater than 600 Vdc). The output of the DC/DC converter may form the DC bus 220, which may include bus hardware (e.g., a low resistance electrically conductive structure, one or more terminals, etc.) The DC bus 220 may comprise a positive terminal and a negative terminal which may also be referred to as a DC return.

The EV 202 comprises a heat transfer material 216, arranged to transfer thermal energy from the electric motor 206 and/or the drive circuit 208 to the battery pack 210. In an embodiment, the heat transfer material 216 may comprise fluid (e.g., a liquid coolant, air, etc.). In another embodiment, the heat transfer material 216 may comprise a solid material such as conducting heat through a chassis, heat pipe, or heat plate with low thermal resistance (e.g., a metal). In an embodiment, the heat transfer material 216 may be actively pumped (e.g., by a coolant pump not shown) or fanned from the motor 206 to the battery pack 210, or it may passively transfer thermal energy (e.g., without pumping, a fan, etc.) solely though thermal conduction.

The EV 202 may implement static battery heating. Static heating refers to using drive circuit 208 and the motor 206 (and windings thereof) to generate heat and warm up the battery pack 210 when the EV 202 is stationary and being charged by electric vehicle charger 214. Additionally, or alternatively, EV 202 may perform dynamic battery heating in preparation for battery charging. For example, while EV 202 is driving toward an electric vehicle charger 214, EV 202 may transfer thermal energy from drive unit 204 to battery pack 210 through heat transfer material 216.

Pump 222 may be fluidly connected to the drive unit 204 to pump oil 224 through the motor 206. Controller 212 may send pump command signals 228 to operate pump 222, such as a pump speed command. The pump 222 may be activated (e.g., commanded with a non-zero pump speed) when the motor 206 is being driving by drive circuit 208. Sensors 226 may comprise a temperature sensor to sense a temperature of the oil 224. Sensors 226 may comprise a current sensor to sense the electric current used to power pump 222. Controller 212 may store telemetry data 234 which includes the sensed data, the control signals 218, pump command signals 228, and other data (e.g., a battery heat state signal) in memory. This data 234 may be retrieved by a pump anomaly detection system 232, which may be received through a wired or wireless communication protocol 230.

Pump anomaly detection system 232 may be configured to determine whether an anomaly is associated with pump 222, based on applying a machine learning model to the data 234. In an embodiment, pump anomaly detection system 232 may determine that an anomaly is present, and in response, present an alert to the electric vehicle 202 that the anomaly is detected. For example, EV 202 may comprise a graphical user interface or a maintenance light that includes a visual indication that an anomaly is detected with the pump 222. Additionally, or alternatively, the pump anomaly detection system 232 may transmit an alert to a service team member, indicating the anomaly associated with EV 202.

Figures 3, 4:
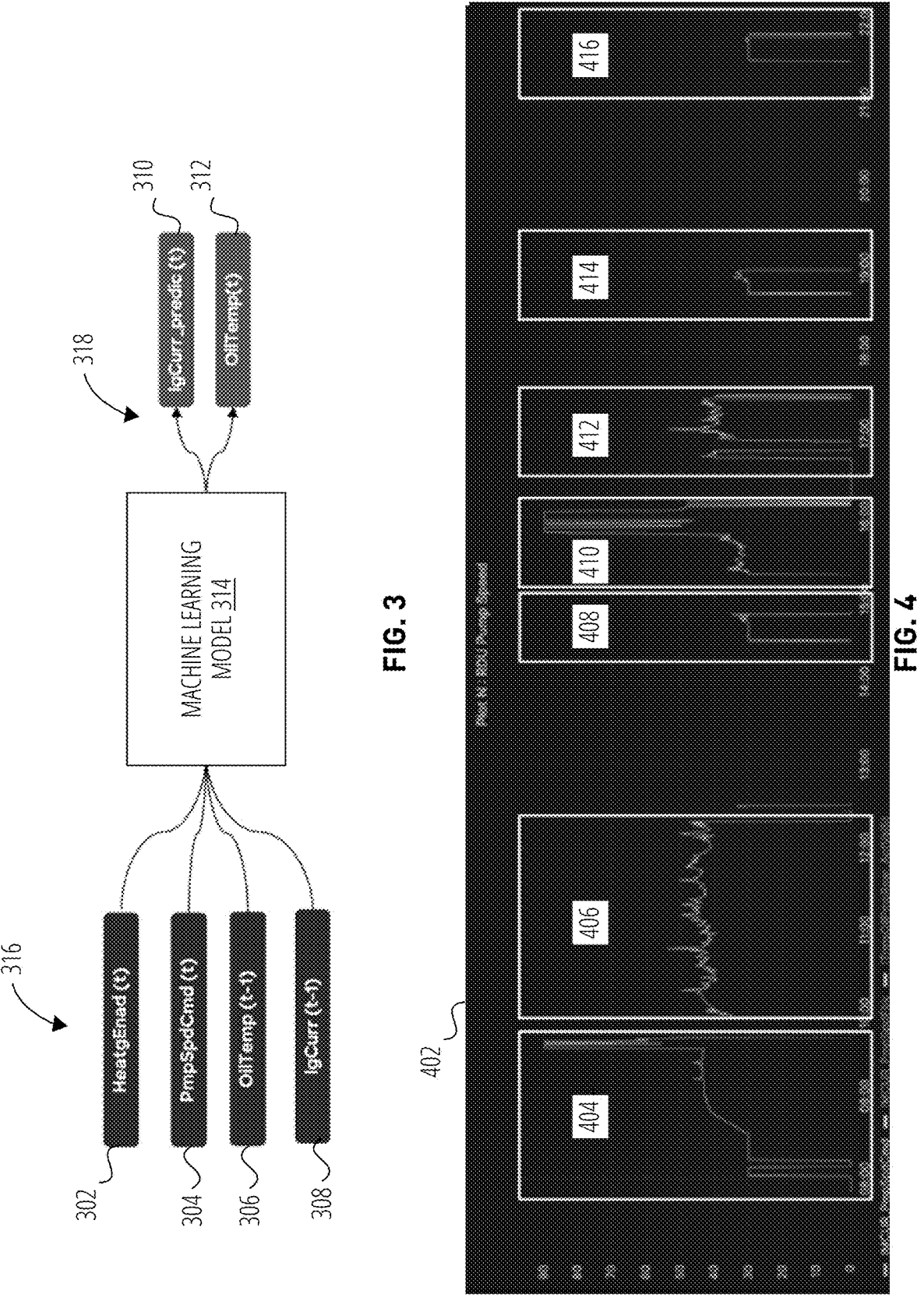
FIG. 3 shows an example of a machine learning model for predicting pump behavior, in accordance with an embodiment.
FIG. 4 shows an examples of session-based pump activity determined based on pump activity, in accordance with an embodiment.

FIG. 3 shows an example of a machine learning model for predicting pump behavior, in accordance with an embodiment. The machine learning model 314 may be configured to train and forecast the performance of drive unit oil pumps or other pumps in a vehicle. The machine learning model 314 analyzes and learns a pump's electric current behavior with time sequence by utilizing time series signal data, such as oil temperature and pump speed commands.

In an embodiment, machine learning model 314 comprises a decision tree, or a gradient boosted decision tree (GBDT), or other ensemble machine learning algorithm. Generally, a decision tree predicts a label (e.g., a pump current, and oil temperature, etc.) that is associated with training data (e.g., labeled sets of pump training data) by evaluating a tree of if-then-else true/false feature questions, and estimating a minimum number of questions to assess the probability of making a correct decision. Decision trees can be used for classification to predict a category or regression to predict a continuous numeric value (e.g., an electric current and/or fluid temperature).

Gradient boosting sets targeted outcomes for each added model while minimizing errors. Targeted outcomes for each training set are based on a gradient (e.g., a direction of change) of the error with respect to a prediction (e.g., predicted electric current of pump and/or fluid temperature). GBDTs iteratively train an ensemble of decision trees, with each iteration using the error residuals of the previous model to fit the next model. The final prediction may comprise a combination (e.g., a weighted sum) of every one of the tree predictions.

In an example, the machine learning model 314 may comprise an XGBoost machine learning model. In such an example, the decision trees in the model may be built in parallel, instead of sequentially like GBDT. The decision trees may be scanned to obtain gradient values (e.g., direction of differences in predictions) and using these to evaluate the quality of each tree split in the training set and to adjust (e.g., pruning, terminating, or creating new splits) accordingly. Such a model may be highly portable and efficient.

During the inference stage, trained machine learning model 314 may receive as input, input parameters 316. The input parameters 316 may comprise at least a pump speed command signal 304 at time t, and an electric current 308 at time t−1. The machine learning model 314 may generate, based on the input parameters 316, one or more output parameters 318. For example, the machine learning model 314 may generate a predicted electric current 310 of the pump at time t. In an example, a time-series signal of pump speed command 304 and electric current 308 is provided to the machine learning model 314 to generate a time series predicted output signal, such as the predicted electric current 310. Each of the input signals and output signals may correspond to a session such as those shown in FIG. 4.

Figure 10:
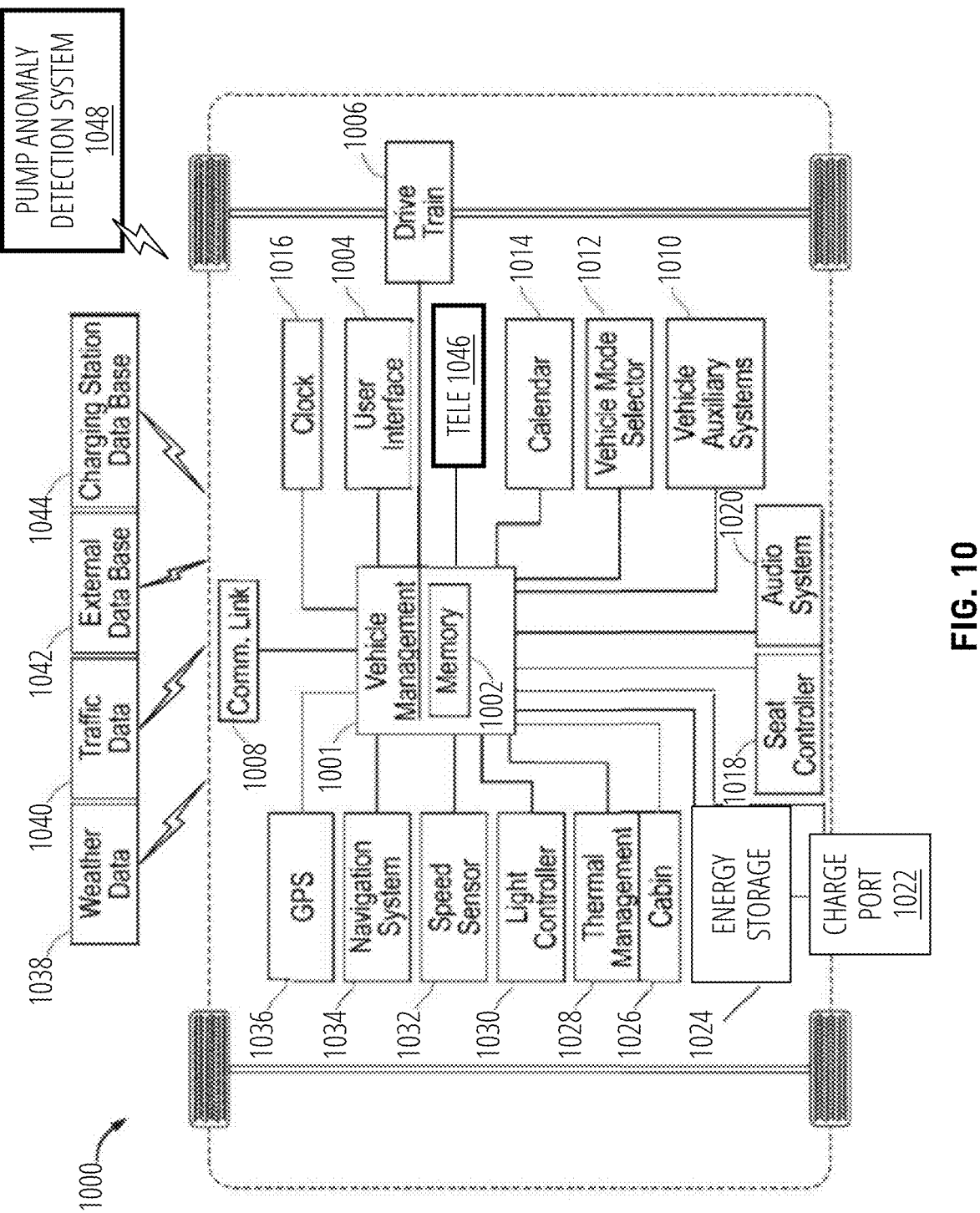
FIG. 10 is a high-level view of some embodiments of a vehicle, in accordance with an embodiment.

FIG. 4 shows an examples of session-based pump activity determined based on pump activity, in accordance with an embodiment. Chart 402 shows how a pump speed command signal may be used to subdivide pump data into individual sessions. The time bounds of each session 404, 406, 408, 410, 412, 414, and 416 may be determined based on periods of pump activity (e.g., non-zero pump speed commands). A session may be determined and bound where there is continuous pump activity. For example, for session 404 may be drawn based on T1 when pump activity begins, and T2 when pump activity ends for a threshold period of time. Small gaps in pump activity (e.g., below a threshold duration) may be included in the same session, as shown in session 404 and session 412, but if the gap exceeds the threshold duration, a new session may be generated. For simplicity, chart 402 shows only the pump speed command signal, but as shown in FIG. 10, each session may have other pump data such as the sensed electric current of the pump and the predicted electric current of the pump, or any of the other input parameters 316 or output parameters 318.

Referring back to FIG. 3, for each session, the machine learning model 314 may generate a time-series signal of the predicted electric current of the pump 310 on a per session basis. In an embodiment, the machine learning model 314 may receive other input parameters 316 such as, for example, an oil temperature 306 at time t−1. This oil temperature may be sensed at an inlet or an outlet of the pump, or an average of both. The machine learning model 314 may also generate an oil temperature 312 at time t, based on the input parameters 316.

In an example, the machine learning model 314 may further receive, as input, a signal 302 that indicates a battery heating state (e.g., whether the pump is being driven at time t to perform battery heating). The machine learning model 314 is trained to emulate a healthy pump under the input parameters 316, to predict the corresponding output parameters 318. The output parameters 318 may be compared downstream with measured pump parameters at time t to determine whether an anomaly is present, as described in other sections.

Figure 5:
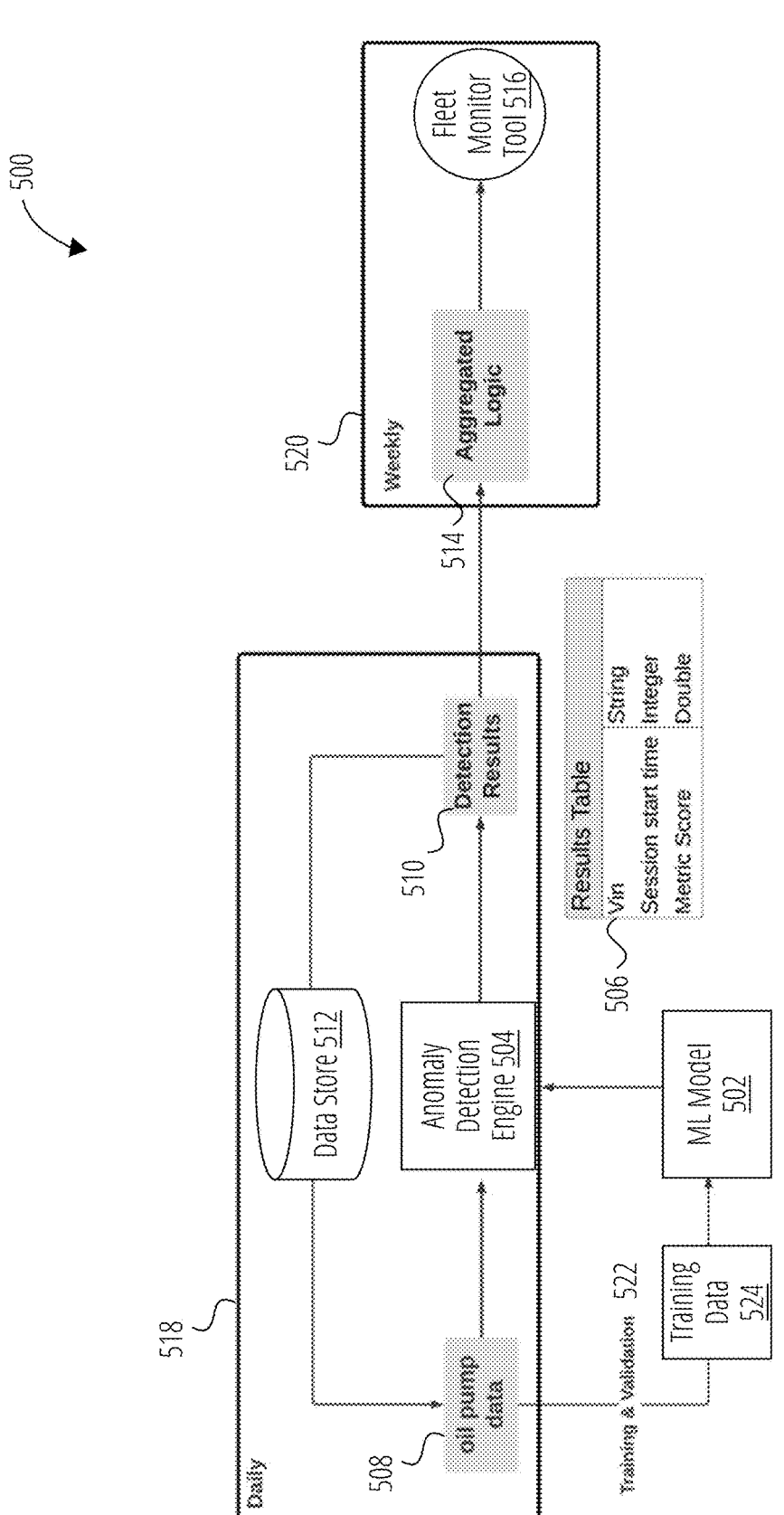
FIG. 5 shows an example of a pump anomaly detection system, in accordance with an embodiment.

FIG. 5 shows an example of a pump anomaly detection system, in accordance with an embodiment. In a training and validation stage 522, ML model 502 may be trained to emulate a healthy pump, based on oil pump data 508. Oil pump data 508 may be stored in data store 512 and comprise labeled training data 524 of a healthy operating pump such as input pump speed commands, electric current of the pump prior to and during the pump speed command, oil temperature prior to and during the pump speed command, and/or a battery heat state of the vehicle. After ML model 502 is trained and validated so that its algorithm is trained to predict pump behavior to within a threshold error, it is deemed to be validated and deployed to anomaly detection engine 504. In an embodiment, data store 512 may be implemented as an Apache Iceberg data store.

At operation 518, which may be performed periodically (e.g., daily, hourly, etc.), oil pump data 508 may be obtained through telemetry from a vehicle and stored in data store 512. This oil pump data 508 may comprise at least pump speed command and the electric current drawn by the pump prior to the application of the pump speed command, but can include additional signals, as described in other sections. Anomaly detection engine 504 may apply the trained ML model 502 to the oil pump data 508 to generate detection results 510 which includes at least a predicted electric current drawn by the pump.

At operation 518, the system compares the detection results 510 against the actual data of the pump (from data store 512), and depending on a difference between the two, may determine that an anomaly is associated with the pump. In an embodiment, the system 500 segments the oil pump data 508 for each vehicle into distinct operational sessions based on continuous time intervals. Subsequently, the ML model 502 is applied to each session, to generate the detection results 510. In an embodiment, the system 500 may generate a Mean Absolute Percentage Error (MAPE) metric score based on the predicted pump performance (e.g., the predicted current) with the actual pump performance, which indicates the data disparity. A higher difference (e.g., MAPE score or other metric) correlates with increased anomaly severity.

Singular reliance on session results for triggering alerts may result in false alerts. In an embodiment, system 500 may, at operation 520, aggregate multiple sessions over a longer period of time than at operation 518. For example, to mitigate false alerts, an aggregation logic block 514 may be implemented weekly, every 14 days, monthly, etc. This aggregation logic block 514 may examine the metric score of all vehicles over the preceding three weeks, producing an aggregated score. If this score falls within predefined alert thresholds, categorized alerts are generated to represent varying anomaly levels. The alert thresholds may be established through comprehensive validation checks conducted on all alerts over a range of time (e.g., 6 months, a year, etc.). Information regarding the vehicle, alert score, and trigger time may be logged to a table 506, and pushed to a fleet monitoring tool 516, which may comprise a server and/or graphical user interface tool for users to examine and sort through alerts.

In an embodiment, system 500 may transmit an alert to a computing device which may be associated with a service team member, an engineering team member, etc. In an embodiment, the alert may be transmitted to a vehicle and cause the vehicle to visually indicate presence of an anomaly (e.g., a light, text, symbol, etc.).

In an embodiment, operation 518 and operation 520 may be implemented on a modular and scalable workflow platform such as, for example, Apache Airflow. A workflow platform may comprise existing processing logic that allows a user to define and schedule tasks as 'workflows' to be performed by the workflow platform. The workflow platform may allow for monitoring, scheduling and management of workflows, such as through a user interface.

Figure 6:
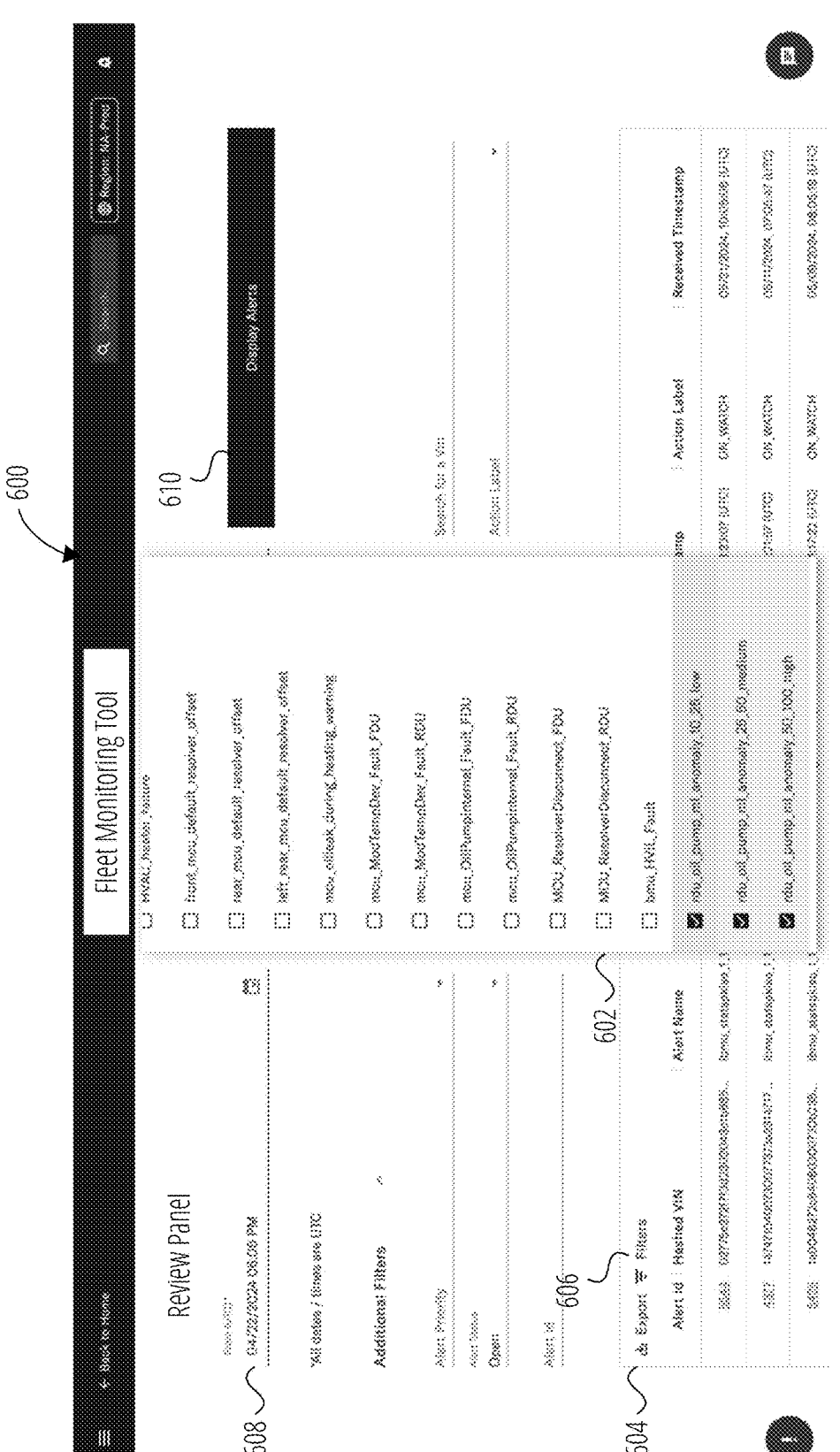
FIG. 6 shows an example of a fleet monitoring tool, in accordance with an embodiment.

FIG. 6 shows an example of a fleet monitoring tool, in accordance with an embodiment.

Fleet monitoring tool 600 may comprise graphical elements that indicate presence of a pump anomaly, as well as other vehicle anomalies or alerts. Fleet monitoring tool 600 may comprise a download control 604 that downloads a desired file to a user node over a computer network, and a filter tool 606 that allows a user to filter through alerts based on name, VIN, alert type, etc. A list 602 may show selectable alert logs for a user to select for download or display. The fleet monitoring tool 600 may comprise an input field 608 that may filter for alerts based on date and time. Alerts may be displayed on the fleet monitoring tool 516 for further action. In an embodiment, alerts may be shown with different severity, such as, for example, low, medium, and high. Fleet monitoring tool 600 may comprise a control 610 to cause one or more pump-based alerts to be displayed.

Generally, the fleet monitoring tool 600 may comprise one or more controls shown either graphically, or capable of being entered through command line interface (CLI), or accessed through an application programming interface (API). In response to receiving an input through the one or more controls, the fleet monitoring tool 600 may transmit alert data such as one or more sessions, whether or not an anomaly is detected with respect to a particular vehicle, and/or a severity of the anomaly.

Figure 7:
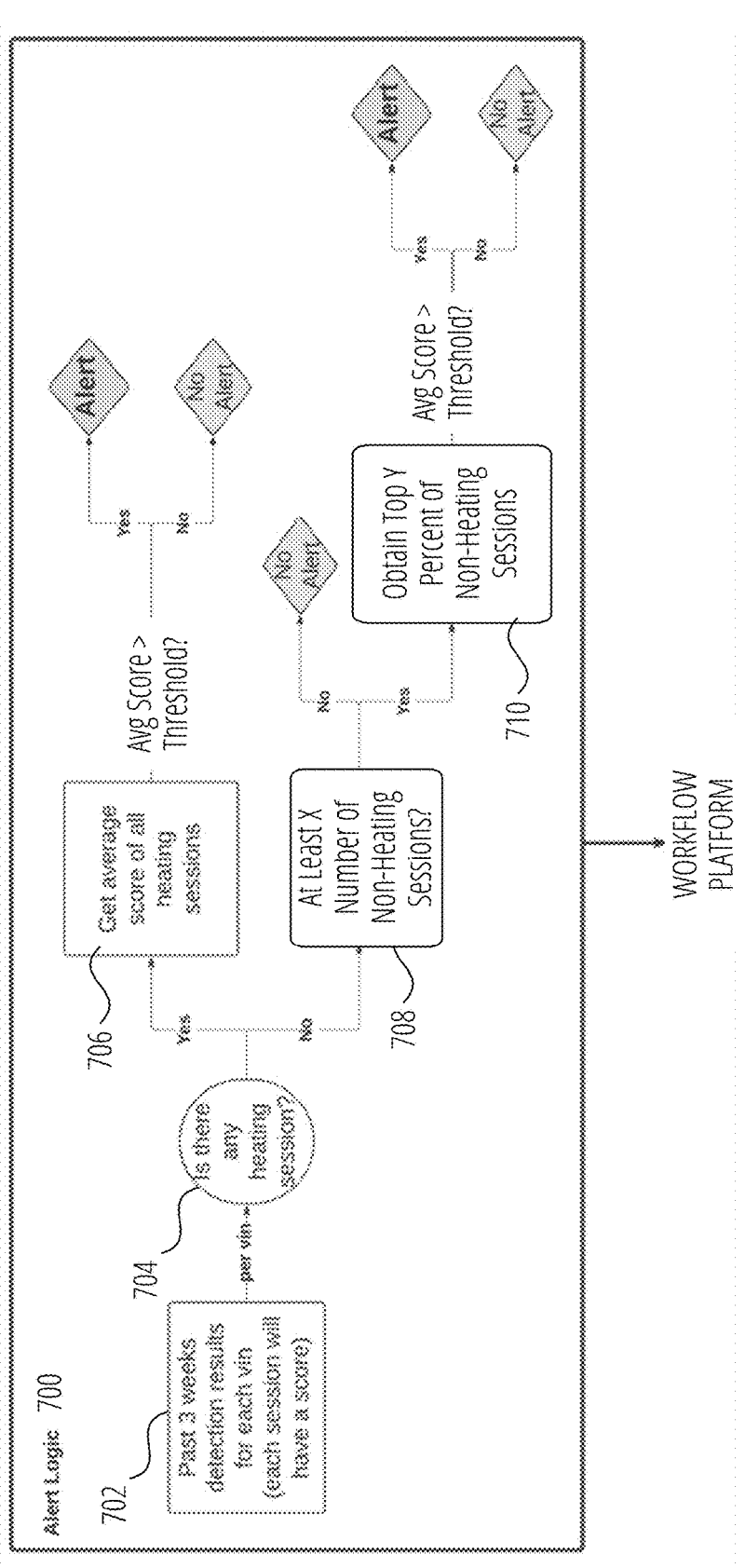
FIG. 7 shows a workflow for alert logic, in accordance with an embodiment.

FIG. 7 shows a workflow for alert logic, in accordance with an embodiment. Alert logic 700 may be applied to aggregated session data for a given vehicle (e.g., based on VIN). Alert logic 700 may be applied at aggregation logic block 514, as described in other sections. At block 702, alert logic 700 may collect the session data over 'X' amount of time (e.g., 3 weeks, 2 weeks, etc.) on a per vehicle basis. At block 704, alert logic 700 separates the sessions to two groups based on whether the session data coincides with battery heating.

For the first group of sessions that do coincide with battery heating, alert logic 700 proceeds to block 706 and determines an average difference score of those sessions (e.g., an average MAPE, etc.). If this average is above a threshold (e.g., 0.1, 0.2, 0.3, etc.), then alert logic 700 determines that an anomaly is present and triggers an alert. Otherwise, an anomaly is not triggered and no alert is triggered.

For the second group of sessions that do not coincide with battery heating, alert logic 700 may proceed to block 708 and count whether a threshold number of these sessions and associated prediction data have been captured. If not, alert logic 700 may exit without alert due to reduce false alerts. If the threshold number of sessions (e.g., 3, 4, 5) have been captured, the alert logic 700 may proceed to block 710 and process the top Y percent or number (e.g., 75%) of non-heating sessions with the highest score. If an average of these scores satisfies a threshold, then alert logic 700 may determine that the anomaly is associated with the pump and signal an alert. Otherwise, the anomaly is not triggered and no alert is signaled.

Figure 8:
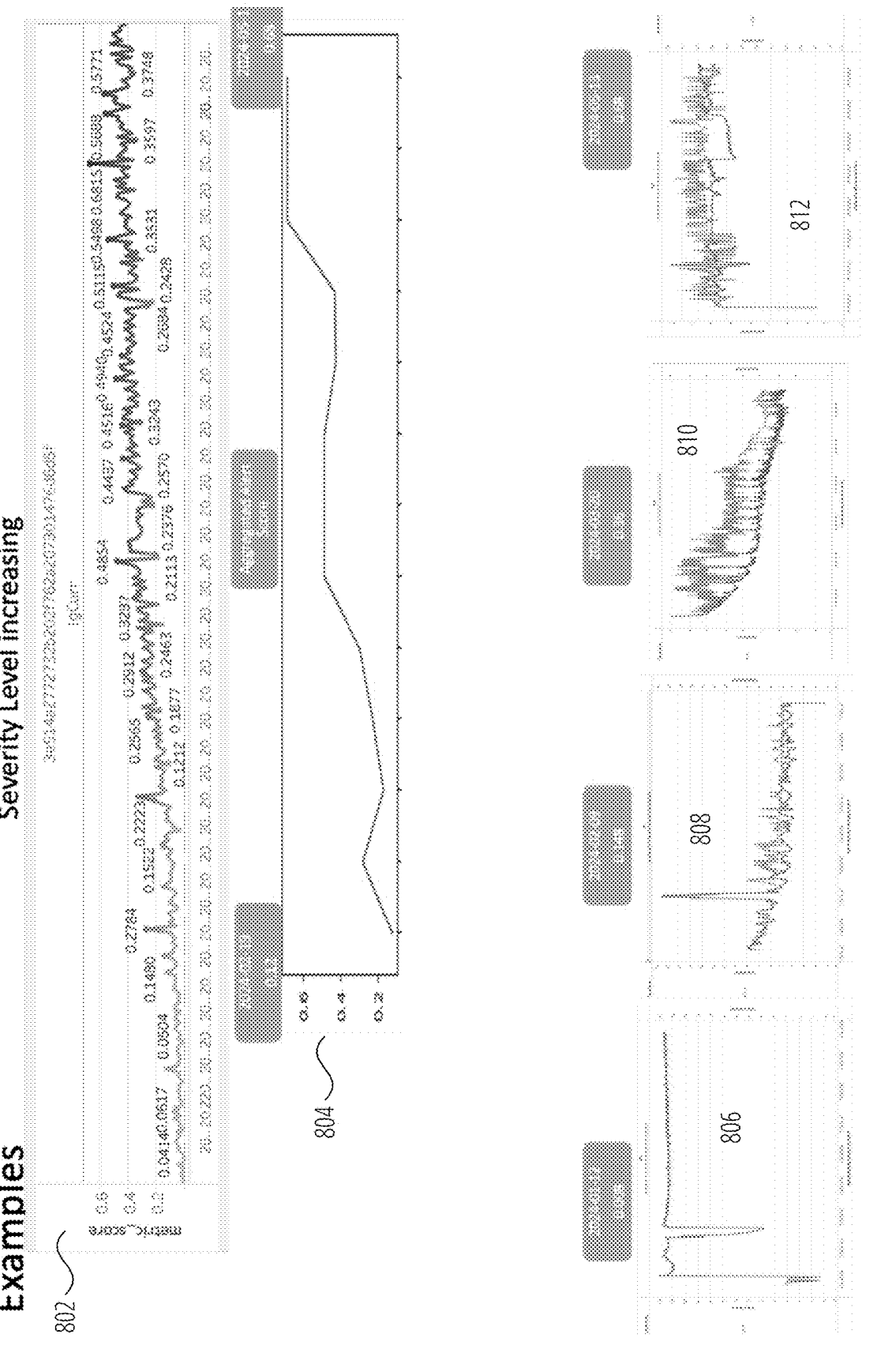
FIG. 8 shows an example of pump anomaly detection with varying severity, in accordance with an embodiment.

FIG. 8 shows an example of pump anomaly detection with varying severity, in accordance with an embodiment. Chart 802 shows different a chart of difference scores determined over several sessions. Chart 804 shows an aggregated alert score chart, which smooths the peaks and valleys of the difference scores, which may help reduce false alerts.

Examples of individual session data are shown in graphs 806, 808, 810, and 812. Each of these session graphs map the predicted electric current of a pump against the sensed electric current of the pump, from which the difference scores are generated from. As shown, the difference between the two signals may vary over time, as pump performance potentially worsens. By monitoring for this difference, subtle degradations in pump performance may be detected prior to severe failure.

FIG. 9 shows a flow diagram of a method 900 for performing machine learning based pump anomaly detection, in accordance with an embodiment. The method 900 may be performed by processing logic that may comprise hardware (circuitry, dedicated logic, etc.), software (such as is run on a general purpose computer system or a dedicated machine), firmware, or a combination.

The method 900 may be performed by a computing device coupled to one or more controllers of an EV. The EV comprises a battery pack, an electric motor, a drive circuit coupled to the electric motor, one or more pumps (e.g., a coolant pump, an oil pump), as described in other sections. Generally, method 900 and other any of the other aspects described may be performed automatically (e.g., without human input or guidance).

At block 902, the method comprises receiving input parameters comprising at least a pump speed command to a pump of a vehicle at a time t, and an electric current of the pump prior to the time t. These input parameters may be received through vehicle telemetry, and stored in a data store, as described in other sections.

At block 904, the method comprises applying, to the input parameters, a machine learning model, configured to determine one or more output parameters comprising at least a predicted electric current of the pump at time t, in response to the pump speed command. The machine learning model may be trained based on training data that is associated with a healthy pump (without mechanical failure, oil leak, or blockage). The training data may be based on the same vehicle make and model, same pump make and model, or both, to ensure congruity between the trained machine learning model and the pump that is being assessed for anomaly.

At block 906, the method comprises determining, based at least on the predicted electric current of the pump and a sensed electric current of the pump at the time t, whether an anomaly is associated with the pump of the vehicle.

In an embodiment, the input parameters further comprises a fluid temperature associated with the pump, sensed prior to the time t. The fluid temperature may be physically correlated to the load on the pump, thus helping the machine learning model more accurately predict the electric current based on the pump speed command, the fluid temperature, and the prior sensed electric current. In an embodiment, the machine learning model receives the input parameters (e.g., the pump speed command, prior electric current, prior oil temperature) each as a time series input, and outputs the predicted electric current as a time series output.

In an embodiment, the input parameters indicates a first vehicle state that the vehicle is operating the pump to transfer thermal energy to a battery pack of the vehicle. This state may be referred to as a battery heating state. The input parameters may indicate a second vehicle state that the vehicle is not operating the pump to transfer thermal energy to the electric vehicle (e.g., not in a battery heating state). For example, the pump may be operated to pump oil through the motor while the motor is being driven for the purpose of transferring thermal energy (e.g., in its stator) to the vehicle's battery pack. This may be done dynamically, (e.g., when the vehicle is in motion) or statically (e.g., when the vehicle is stationary). At this time, a signal may be recorded in vehicle telemetry to indicate that at time n, the vehicle was in a battery heating state. At a different time m, this same signal may indicate that the vehicle is no longer in a battery heating state.

In an embodiment, determining whether the anomaly is associated with the pump of the vehicle comprises determining a difference between a time-series of the sensed electric current, and a time-series of the predicted electric current, and determining that the anomaly is associated with the pump in response to when the difference satisfies a threshold. In an example, this difference may be determined as a MAPE score, or a deviation of the sensed and predicted current, or other measure of difference between the two.

In an embodiment, determining whether the anomaly is associated with the pump of the vehicle further comprises grouping the time-series of the sensed electric current and the time-series of the predicted electric current into first sessions and second sessions, based on the first state and the second state, and comparing the time series of the first sessions and the second session according to the first state and the second state to determine if a respective threshold is satisfied.

For example, as described with respect to FIG. 6 and FIG. 7, the first session may correspond to sessions that coincide with battery heating. In such a case, the method may determine whether a combined score (e.g., average score) of the difference of each session satisfies a threshold. If yes, then the anomaly may be detected. For the second sessions that are not associated with battery heating, if a threshold number of second sessions are generated, the method may take a subset (e.g., a percentage or number) of those sessions with the highest score and combine those scores (e.g., an average). If that combined difference score satisfies a threshold, then the method detects the anomaly. Otherwise, the method determines that there is no anomaly.

In an embodiment, the pump is configured to pump oil through an electric motor of the vehicle. Additionally, or alternatively, the pump is configured to pump coolant through the vehicle. The coolant may transfer thermal energy from the drive unit of the vehicle to the electric battery, thereby heating the battery to a desired temperature for improved charging.

In an embodiment, the anomaly comprises at least one of: an oil leakage, an oil fill amount, pump blockage, or debris. For example, depending on the difference between the predicted output parameters of the pump, and the sensed performance of the pump, the method may determine whether the anomaly is an oil leak, or low oil fill amount, or pump blockage, or debris in the fluid lines.

In an embodiment, the anomaly comprises a severity, determined based on an amount of the difference, or based on a history of detected anomalies, or a combination of the two. For example, the method may detect a low severity if the difference below a threshold, and the number of occurrences is also below a threshold. If the anomaly persists in future sessions, or if the difference between predicted and sensed parameters grow, or both, the severity may be determined as medium or high, depending on corresponding thresholds.

FIG. 10 is a high-level view of some embodiments of a vehicle 1000, in accordance with an embodiment. Vehicle 1000 can be an electric vehicle (EV), a vehicle utilizing an internal combustion engine (ICE), or a hybrid vehicle, where a hybrid vehicle utilizes multiple sources of propulsion including an electric drive system. Vehicle 1000 includes a vehicle on-board system controller 1001, also referred to herein as a vehicle management system, which is comprised of one or more processors (e.g., a central processing unit (CPU)). System controller 1001 also includes memory 1002, with memory 1002 being comprised of EPROM, EEPROM, flash memory, RAM, solid state drive, hard disk drive, or any other type of memory or combination of memory types.

In some embodiments, vehicle 1000 includes one or more internal networks by which system controller 1001 interfaces and communicates with one or more internal subsystems of vehicle 1000. System controller 1001 can also use the one or more internal networks to transfer communications to and from external locations. In some embodiments, the one or more internal networks can be communicably coupled to one or more networks through a network interface. The network interface can provide for wired and/or wireless communication. When used in a local area networking environment (or a wide area networking environment), the network interface can include an Ethernet interface and the one or more internal networks includes an Ethernet communication network (e.g., an Ethernet Ring, etc.) with an Ethernet Port. Other possible embodiments use other communication devices. For example, in some embodiments vehicle 1000 includes a modem for communicating across an internal network and/or with an external network.

In some embodiments, vehicle 1000 includes a charge port 1022 and one or more batteries (e.g., battery pack, etc.), and a battery charger, as an energy storage system 1024 that provides power to portions of vehicle 1000. The charge port 1022 is used for providing voltage to vehicle 1000 for charging the energy storage system 1024 (e.g., charging batteries by the use of, for example, an EVSE or other power source in a manner well-known in the art. The charging port 1022 can be used to transfer power from a battery of the energy storage system 1024 to an external location as part of a vehicle-to-grid power transfer. In some embodiments, charging port 1022 includes a communication path for communications between the system controller 1001 and the locations external to vehicle 1000 such as, for example, the power source providing power (voltage) to vehicle 1000 for charging batteries of the energy storage system 1024 and a utility distributed energy resource management system (DERMS) or an electric utility company and its facilities.

In some embodiments, energy storage system 1024 includes an inverter that generates voltage for transfer to an electric power grid. In some embodiments, the inverter converts DC voltage to AC voltage for transfer to the electric power grid. In some embodiments, the same inverter (or a separate invertor) converts DC voltage to AC voltage for charging a battery of the energy storage system 1024 or can provide DC to AC voltage conversion when providing power to an electrical power grid as part of a vehicle-to-grid operation. In the case of DC fast charging, the inverter may be bypassed to charge the battery pack directly with DC voltage from a charger that is connected to 1022.

In some embodiments, vehicle 1000 includes a user interface 1004 is coupled to vehicle management system 1001. Interface 1004 allows the driver, or a passenger, to interact with the vehicle management system, for example inputting data into the navigation system 1034, altering the heating, ventilation and air conditioning (HVAC) system via the thermal management system 1028, controlling the vehicle's entertainment system (e.g., radio, CD/DVD player, etc.), adjusting vehicle settings (e.g., seat positions, light controls, etc.), and/or otherwise altering the functionality of vehicle 1000. In some embodiments, user interface 1004 also includes means for the vehicle management system to provide information to the driver and/or passenger, information such as a navigation map or driving instructions (e.g., via the navigation system 1034 and GPS system 1036) as well as the operating performance of any of a variety of vehicle systems (e.g., battery pack charge level for an EV, fuel level for an ICE-based or hybrid vehicle, selected gear, current entertainment system settings such as volume level and selected track information, external light settings, current vehicle speed (e.g., via speed sensor 1032), current HVAC settings such as cabin temperature and/or fan settings, etc.) via the thermal management system 1028. Interface 1004 may also be used to warn the driver of a vehicle condition (e.g., low battery charge level or low fuel level) and/or communicate an operating system malfunction (battery system not charging properly, low oil pressure for an ICE-based vehicle, low tire air pressure, etc.). Vehicle 1000 can also include other features like an internal clock 1016 and a calendar 1014.

In some embodiments, user interface 1004 includes one or more interfaces including, for example, a front dashboard display (e.g., a cockpit display, etc.), a touch-screen display (e.g., a pilot panel, etc.), as well as a combination of various other user interfaces such as push-button switches, capacitive controls, capacitive switches, slide or toggle switches, gauges, display screens, warning lights, audible warning signals, etc. It should be appreciated that if user interface 1004 includes a graphical display, controller 1001 may also include a graphical processing unit (GPU), with the GPU being either separate from or contained on the same chip set as the processor.

Vehicle 1000 also includes a drive train 1006 that can include an internal combustion engine, one or more motors, or a combination of both. The vehicle's drive system can be mechanically coupled to the front axle/wheels, the rear axle/wheels, or both, and may utilize any of a variety of transmission types (e.g., single speed, multi-speed) and differential types (e.g., open, locked, limited slip). Drive train 1006 may also comprise one or more drive units each comprising a drive circuit and respective motor.

Drivers often alter various vehicle settings, either when they first enter the car or while driving, in order to vary the car to match their physical characteristics, their driving style and/or their environmental preferences. System controller 1001 monitors various vehicle functions that the driver may use to enhance the fit of the car to their own physical characteristics, such as seat position (e.g., seat position, seat height, seatback incline, lumbar support, seat cushion angle and seat cushion length) using seat controller 1018 and steering wheel position using an auxiliary vehicle system controller 1010. In some embodiments, system controller 1001 also can monitor a driving mode selector 1012 which is used to control performance characteristics of the vehicle (e.g., economy, sport, normal). In some embodiments, system controller 1001 can also monitor suspension characteristics using auxiliary vehicle system 1010, assuming that the suspension is user adjustable. In some embodiments, system controller 1001 also monitors those aspects of the vehicle which are often varied by the user in order to match his or her environmental preferences for the cabin 1026, for example setting the thermostat temperature or the recirculation controls of the thermal management system 1028 that uses an HVAC controller, and/or setting the radio station/ volume level of the audio system using controller 1020, and/or setting the lights, either internal lighting or external lighting, using light controller 1030. Also, besides using user-input and on-board sensors, system controller 1001 can also use data received from an external on-line source that is coupled to the controller via communication link 1008 (using, for example, GSM, EDGE, UMTS, CDMA, DECT, Wi-Fi, WiMax, etc.). For example, in some embodiments, system controller 1001 can receive weather information using an on-line weather service 1038 or an on-line data base 1042, traffic data 1040 for traffic conditions for the navigation system 1034, charging station locations from a charging station database 1044, etc. In some embodiments, communication link 1008 comprises an Ethernet communication link with an Ethernet Port for external communications.

The system controller 1001 can transfer information with the components described above over one or more internal networks, such as those, for example, described above. In some embodiments, the system controller 1001 is communicably coupled to one or more of these components via an Ethernet communication network (e.g., an Ethernet Ring, etc.). The Ethernet communication network can be used to transfer other data such as data related to, but not limited to, one or more of a driver-assistance system, telematics, over-the-air updates, etc.

The vehicle may comprise a thermal management system 1028 which may include one or more temperature sensors, one or more cooling systems (e.g., liquid lines, coolant, pump, fan, heatsink, heat pipe, cooler, evaporator, refrigeration, etc.).

The vehicle may communicate with pump anomaly detection system 1048 which is responsible for software and firmware updates to each of the updateable components of the vehicle (e.g., GPS 1036, navigation system 1034, speed sensor 1032, light controller 1030, thermal management 1028, energy storage system 1024, seat controller 1018, audio system 1020, vehicle aux systems 1010, vehicle mode selector 1012, calendar 1014, user interface 1004, clock 1016, vehicle management 1001, communications link 1008, or other components not shown.

In an embodiment, thermal management system 1028 may comprise a controller that generates a pump speed command and provides this as input to a pump (e.g., an oil pump, a coolant pump). The pump speed command and magnitude thereof may be generated based on internal logic such as sensed temperature of the engine, operation of the engine, whether battery heating is being performed, or other factors, as known by one skilled in the art.

Telemetry controller 1046 may monitor and record signals on one or more buses of the vehicle, such as, for example, the sensed pump electric current over time, the sensed oil temperature over time, the pump speed command, the battery heating state, or other sensed data. Upon request, the vehicle may transmit this data to a pump anomaly detection system 1048 which comprises a machine learning model and other processing logic to detect whether an anomaly is associated with a vehicle pump, as described in other sections.

It is to be understood that the above description is intended to be illustrative, and not restrictive. Many other embodiments will be apparent to those of skill in the art upon reading and understanding the above description. The scope should, therefore, be determined with reference to the appended claims, along with the full scope of equivalents to which such claims are entitled.

The foregoing description, for purpose of explanation, has been described with reference to specific embodiments. However, the illustrative discussions above are not intended to be exhaustive or to limit the described embodiments to the precise forms disclosed. Many modifications and variations are possible in view of the above teachings. The embodiments were chosen and described in order to best explain the principles and practical applications of the various embodiments, to thereby enable others skilled in the art to best utilize the various embodiments with various modifications as may be suited to the particular use contemplated.

What is claimed is:

1. A method, performed by a processing device, comprising:

receiving input parameters comprising at least a pump speed command to a pump of a vehicle at a time t, and an electric current of the pump prior to the time t;

applying, to the input parameters, a machine learning model, configured to determine one or more output parameters comprising at least a predicted electric current of the pump at the time t, in response to the pump speed command, wherein the machine learning model is trained to emulate a load response of a healthy pump based at least on the electric current of the pump prior to the time t and in response to the pump speed command; and determining, based at least on the predicted electric current of the pump and a sensed electric current of the pump at the time t, whether an anomaly is associated with the pump of the vehicle; and transmitting, by the processing device, a signal to cause the vehicle to present a visual indication of the anomaly or transmitting to a second processing device, an indication of the anomaly.

2. The method of claim 1, wherein the input parameters further comprises a fluid temperature associated with the pump, sensed prior to the time t.

3. The method of claim 1, wherein the input parameters comprise a first vehicle state that the vehicle is operating the pump to transfer thermal energy to a battery of the vehicle.

4. The method of claim 3, wherein the input parameters comprise a second vehicle state that the vehicle is not operating the pump to transfer thermal energy to the battery of the vehicle.

5. The method of claim 4, wherein determining whether the anomaly is associated with the pump of the vehicle comprises:

determining a difference between i) a time-series of the sensed electric current and ii) a time-series of the predicted electric current; and determining that the anomaly is associated with the pump in response to when the difference satisfies a threshold.

6. The method of claim 5, wherein determining whether the anomaly is associated with the pump of the vehicle further comprises:

grouping the time-series of the sensed electric current and the time-series of the predicted electric current into first sessions and second sessions, based on the first vehicle state and the second vehicle state; and determining that the anomaly is associated with the pump in response to when a combined difference of the first sessions satisfies a first threshold.

7. The method of claim 6, wherein determining whether the anomaly is associated with the pump of the vehicle further comprises determining that the anomaly is associated with the pump in response to when a threshold number of second sessions is satisfied, and when a second combined difference of a subset of the second sessions satisfies a second threshold.

8. The method of claim 1, wherein the pump is configured to pump oil through an electric motor of the vehicle.

9. The method of claim 1, wherein the pump is configured to pump coolant through the vehicle.

10. The method of claim 1, wherein the anomaly comprises at least one of: an oil leakage, an oil fill amount, pump blockage, or pump debris.

11. The method of claim 1, wherein the anomaly comprises a severity of the anomaly.

12. A server computer system comprising:

a memory; and one or more processors coupled with the memory configured to perform operations, comprising:

receiving input parameters comprising at least a pump speed command to a pump of a vehicle at a time t, and an electric current of the pump prior to the time t;

applying, to the input parameters, a machine learning model, configured to determine one or more output parameters comprising at least a predicted electric current of the pump at the time t, in response to the pump speed command, wherein the machine learning model is trained to emulate a load response of a healthy pump based at least on the electric current of the pump prior to the time t and in response to the pump speed command; and determining, based at least on the predicted electric current of the pump and a sensed electric current of the pump at the time t, whether an anomaly is associated with the pump of the vehicle; and transmitting a signal to cause the vehicle to present a visual indication of the anomaly or transmitting to a second server computer, an indication of the anomaly.

13. The server computer system of claim 12, wherein the input parameters further comprises a fluid temperature associated with the pump, sensed prior to the time t.

14. The server computer system of claim 12, wherein the input parameters comprise a first vehicle state that the vehicle is operating the pump to transfer thermal energy to a battery of the vehicle.

15. The server computer system of claim 14, wherein the input parameters comprise a second vehicle state that the vehicle is not operating the pump to transfer thermal energy to the battery of the vehicle.

16. The server computer system of claim 15, wherein determining whether the anomaly is associated with the pump of the vehicle comprises:

determine a difference between i) a time-series of the sensed electric current and ii) a time-series of the predicted electric current; and determine that the anomaly is associated with the pump in response to when the difference satisfies a threshold.

17. A non-transitory computer-readable memory storing instructions that, when executed by one or more processors, cause the one or more processors to perform operations, comprising:

receiving input parameters comprising at least a pump speed command to a pump of a vehicle at a time t, and an electric current of the pump prior to the time t;

applying, to the input parameters, a machine learning model, configured to determine one or more output parameters comprising at least a predicted electric current of the pump at the time t, in response to the pump speed command, wherein the machine learning model is trained to emulate a load response of a healthy pump based at least on the electric current of the pump prior to the time t and in response to the pump speed command;

determining, based at least on the predicted electric current of the pump and a sensed electric current of the pump at the time t, whether an anomaly is associated with the pump of the vehicle; and transmitting a signal to cause the vehicle to present a visual indication of the anomaly or transmitting to a second server computer, an indication of the anomaly.

18. The computer-readable memory of claim 17, wherein the input parameters further comprises a fluid temperature associated with the pump, sensed prior to the time t.

19. The computer-readable memory of claim 17, wherein the input parameters comprise a first vehicle state that the vehicle is operating the pump to transfer thermal energy to a battery of the vehicle.

20. The computer-readable memory of claim 19, wherein the input parameters comprise a second vehicle state that the vehicle is not operating the pump to transfer thermal energy to the battery of the vehicle.

21. A method, performed by a processing device, comprising:

receiving input parameters comprising at least a pump speed command to a pump of a vehicle at a time t, and an electric current of the pump prior to the time t;

applying, to the input parameters, a machine learning model, configured to determine one or more output parameters comprising at least a predicted electric current of the pump at the time t, in response to the pump speed command; and determining, based at least on the predicted electric current of the pump and a sensed electric current of the pump at the time t, whether an anomaly is associated with the pump of the vehicle wherein determining whether the anomaly is associated with the pump of the vehicle comprises grouping a time-series of the sensed electric current and a time-series of the predicted electric current into first sessions and second sessions, based on a first vehicle state that the vehicle is operating the pump to transfer thermal energy to a battery of the vehicle, and a second vehicle state that the vehicle is not operating the pump to transfer thermal energy to a battery of the vehicle, and determining that the anomaly is associated with the pump in response to when a combined difference of the first sessions satisfies a first threshold; and transmitting, by the processing device, a signal to cause the vehicle to present a visual indication of the anomaly or transmitting to a second processing device, an indication of the anomaly.

* * * * *